Dec. 2, 1930.  S. C. KNEFEL  1,783,381
BOILER RETURN AND VACUUM TRAP

Filed March 3, 1930

Inventor:
Stanley C. Knefel,
by Rippey & Kingsland.
His Attorneys.

Patented Dec. 2, 1930

1,783,381

UNITED STATES PATENT OFFICE

STANLEY C. KNEFEL, OF ST. LOUIS, MISSOURI

BOILER RETURN AND VACUUM TRAP

Application filed March 3, 1930. Serial No. 432,628.

This invention relates to an improved boiler return and vacuum trap for use in connection with steam boilers for controlling the return to the boiler of the water resulting from the condensation of steam in the system, to which steam is supplied by the boiler.

An object of the invention is to provide an improved vacuum trap having a pipe for conducting thereto the water from the system produced by the condensation of steam in the system, and for conducting the water to the boiler, in combination with means for utilizing the steam from the boiler to force the water from the trap and means for condensing the steam in the trap to create a vacuum to cause or permit the refilling of the trap by water from the system, and to repeat these operations automatically and as an incident to the operation of the boiler.

Other objects will appear from the following description, reference being made to the accompanying drawing, in which—

Figure 1:
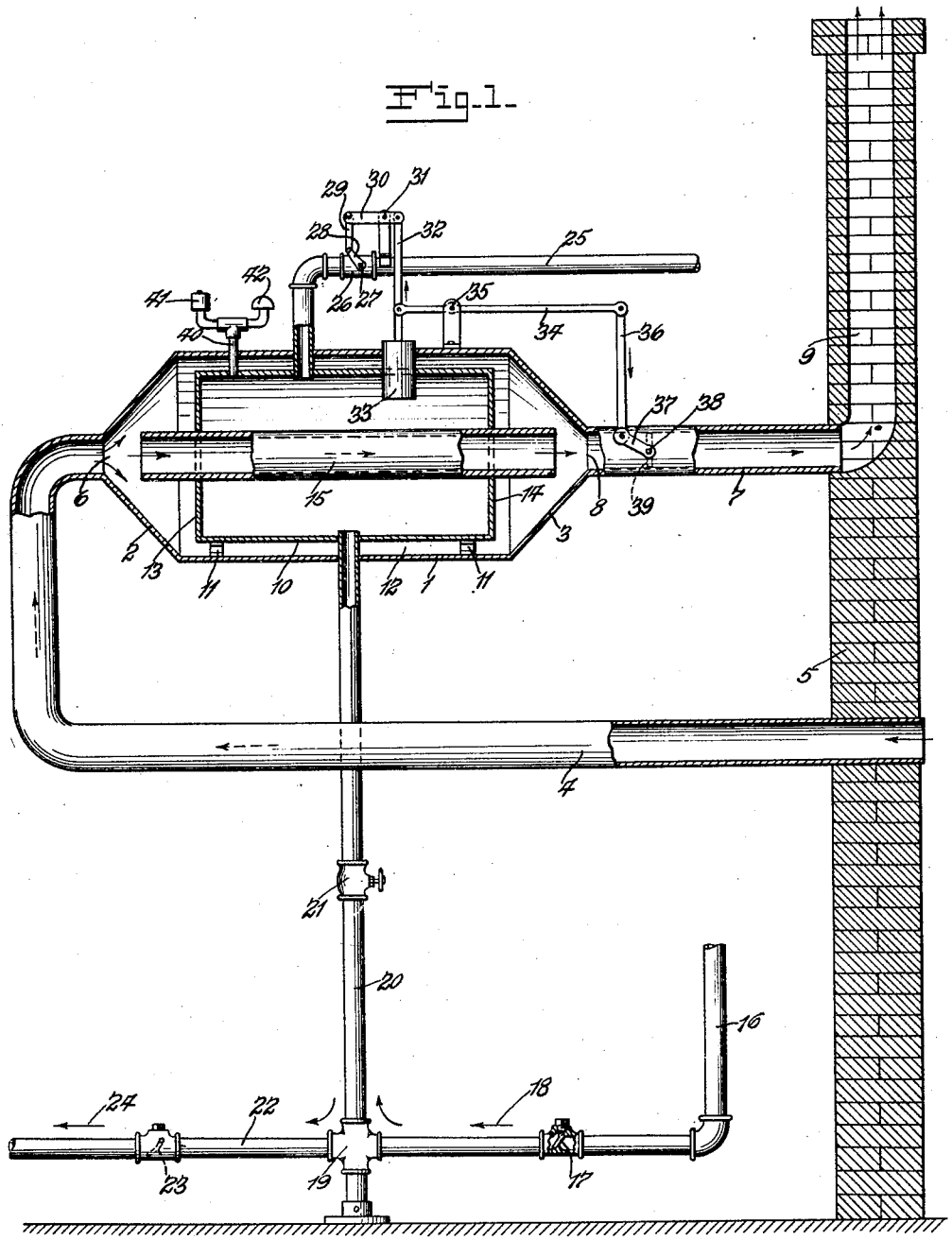
Fig. 1 is a view showing some of the pipe connections in elevation and showing the vacuum trap in section.
Figure 2:
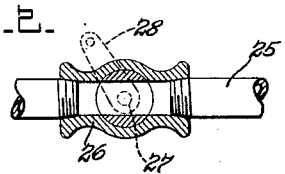
Fig. 2 is a sectional view showing a valve for the steam inlet pipe to the trap.

In the embodiment of the invention shown, there is an outer or condenser tank 1 having a conical wall 2 at the inlet end and a conical wall 3 at the outlet end. A pipe 4 opens to the outside through the building wall 5, or may be otherwise arranged so as to receive and conduct air into the tank or condenser 1 through the center of the wall 2. For this purpose, the pipe 4 has hermetic connection with the wall 2 around the central hole 6 through said wall 2. For the purpose of conducting the air from the tank or condenser 1 and permitting free passage of the air into and through and out of said tank or condenser, a pipe 7 is hermetically connected with the wall 3 around the outlet opening 8 at the center of said wall 3 and in axial alinement with the inlet opening 6. The pipe 7 opens into a flue 9, which may be within or in connection with the wall 5, or otherwise arranged, as desired.

A vacuum trap tank 10 is supported centrally within the tank or condenser 1 by circumferentially and longitudinally spaced supports or spacers 11. These supports or spacers 11 are arranged in spaced relationship so as to support the vacuum trap or tank 10 within the tank or condenser 1 and spaced therefrom so as to provide a substantially unobstructed passage 12 between the condenser 1 and the trap 10. This passage 12 extends from end to end of the trap 10 so that air entering the condenser 1 through the inlet opening 6 may pass freely through the passage 12 along and into contact with the outer surface of the wall of the trap 10, so as to cool said trap 10 and cause condensation of steam therein.

In order to cause and force a part of the air entering the condenser 1 to circulate and pass through the passage 12, the end wall 13 is arranged opposite the inlet opening 6. The conical end wall 2 permits the air to spread so that part of the air will pass freely through the passage 12 that surrounds the vacuum trap 10. The opposite end wall 14 of the vacuum trap is spaced from the conical wall 3 so that the air may pass freely to and through the outlet opening 8 and through the pipe 7 and flue 12.

A pipe 15 extends axially through the trap 10 and through the end walls 13 and 14 thereof and has its ends open and in axial alinement with the inlet and outlet openings 6 and 8, respectively. Thus, a part of the cool air admitted to the condenser 1 through the pipe 4 may pass axially through the condenser and thus subject the central portion of the condenser to the cooling effect of the air. The wall of the pipe 15 is imperforate, so that no air may pass therefrom to the inside of the condenser, nor may any of the contents of the condenser enter said pipe.

The pipe 16 is a return pipe from the system to which steam is supplied by the boiler, and is for the purpose of returning to the boiler the water produced by the condensation of the steam in the system. Of course, it is unnecessary to illustrate the connection of this return pipe with the system, for such connection is well known. This pipe has therein a check valve 17, permitting the water to flow in the direction of the arrow 18, and preventing the water from flowing in the opposite direction. The pipe 16 is connected into a fitting 19 from which a pipe 20 extends. The pipe 20 extends through a hole in the wall of the condenser 1 and across the space 12 and opens into the trap 10. The joints formed by the pipe 20 with the walls of the condenser 1 and the trap 10 are impervious, so that there is no leakage through these joints. The pipe 20 is equipped with a manually operative valve 21 of familiar construction, which may be operated to open and to close said pipe.

From the fitting 19, a pipe 22 leads to the boiler and is connected with the boiler in such a way as to discharge into the boiler the water that is returned to the boiler from the system, and which is accumulated by the condensation of steam in the system. Such a connection of a return pipe with a boiler is so well known that no showing thereof is needed to enable those skilled in the art to understand the invention. The pipe 22 is equipped with a check valve 23 of a familiar type that permits the water to flow through the pipe 22 in the direction of the arrow 24, but prevents the water from flowing through the valve 23 in the opposite direction.

A pipe 25 is arranged to conduct steam from the boiler. The connection of a pipe to conduct steam from a boiler is so well known that no showing of such connection is needed. The pipe 25 extends through a hole in the wall of the condenser 1 and across the space 12 and through a hole in the wall of the trap 10, and opens into said trap. A rock valve device 26 is mounted in the pipe 25 and is operative by rocking movements to open and to close said pipe 25. These rocking valves are of familiar construction and I prefer to use a well known form thereof. This valve has a stem 27 to which is attached a lever 28 connected by a link 29 with one end of a lever 30. The lever 30 is supported on a pivot 31 intermediate of its ends, and the opposite end of said lever 30 is pivoted to the longitudinally movable member 32 of a thermostatic device 33. The thermostatic device 33 is supported in holes in the walls of the members 1 and 10. The thermostatic device extends well into the trap 10 and across the space 12 and is constructed in a familiar way so as to move the member 32 outwardly when heated beyond a predetermined degree of heat, and to move the member 32 inwardly when the temperature is reduced below a predetermined degree. Thus, the thermostatic device 33 is a familiar element for moving the part 32 outwardly when heated and inwardly when cooled. Thermostatic devices for imparting such movements to members to be controlled thereby are quite well known, and no specific illustration of the device is required.

A lever 34 is pivotally supported intermediate of its ends upon a pivot 35, and has one end pivoted to the member 32 and the opposite end pivoted to one end of a link 36. The opposite end of the link 36 is pivoted to one end of a lever 37, the opposite end of said lever 37 being attached to the stem 38 of a butterfly valve 39 within the tank pipe 7.

A pipe 40 opens into the trap and extends across the space 12 and through the wall of the condenser 1. This pipe 40 is equipped on its outer end with a familiar vacuum breaker 41 and a familiar air valve 42. The vacuum breaker 41 functions to admit air into the trap 10 to break the vacuum therein under conditions to be controlled by the user of the device, and the air valve 42 functions to permit the air to be exhausted from the trap 10 under conditions to be controlled by the user of the device.

When this device is in use, the valve 21 is open. Water accumulated by the condensation of steam in the system will flow through the pipe 16, and thence through the pipe 20, into the trap 10. During the time that the water is flowing into the trap 10, the valve 26 is closed and the valve 39 is open. Thus, no steam can enter the trap from the pipe 25, and any excess amount of air in the trap is forced therefrom through the air valve 42. The valve 39 is always open when the valve 26 is closed, and vice versa. The valve 39 being open during the time that water is flowing into the trap 10, free circulation of air around and about the trap 10 and through the condenser 1 is permitted and continues. Thus, the water in the trap 10 is cooled and the thermostatic device 33 is cooled. The cooling of the thermostatic device 33 actuates the member 32 inwardly, thereby opening the valve 26 and simultaneously closing the valve 39. The opening of the valve 26 permits steam from the boiler to enter the trap 10 and prevents further circulation and passage of air through the condenser. The steam pressure within the trap forces therefrom the water that had entered the trap 10 through the pipe 20. This steam pressure forces the water through the pipes 20 and 22 to the boiler, it being impossible for the water to flow back to the pipe 16 because of the check valve 17. The steam entering the trap 10 heats the thermostatic device 33, thereby simultaneously closing the valve 26 and opening the valve 39. This occurs only after most or all of the water has been forced from the trap 10. When the valve 39 is opened, the cool air immediately circulates through the condenser and about the trap 10, thus condensing the steam in the trap and cooling the thermostatic device 33. The condensation of the steam in the trap 10 creates therein a vacuum so that, when the valve is closed, water from the system is drawn into the trap 10 through the pipes 16 and 20. The trap 10 again becomes filled with water and the thermostatic device 33 again becomes cooled and, at the proper time, reopens the valve 26 and closes the valve 39. This cycle of operations is repeated as long as the boiler is in use.

It is now clear that my invention obtains all of its intended objects and purposes in a highly efficient and satisfactory way. The construction and arrangement of parts may be varied within equivalent limits without departure from the nature and principle of the invention. I do not restrict myself unessentially, but what I claim and desire to secure by Letters Patent is:—

1. A device of the character described, comprising a condenser, a vacuum trap supported in the condenser, means for admitting water into the trap, a pipe for admitting steam into the trap, means for causing a circulation of air through the condenser and about the trap, a valve for opening and closing said pipe, and automatic means for opening said valve to admit steam to the trap when the trap becomes filled with water.

2. A device of the character described, comprising a condenser, a vacuum trap supported in the condenser, means for admitting water into the trap, a pipe for admitting steam into the trap, means for causing a circulation of air through the condenser and about the trap, a valve for opening and closing said pipe, and automatic means for opening said valve to admit steam to the trap when the trap becomes filled with water and for closing said valve after a desired amount of steam has entered said trap.

3. A device of the character described, comprising a condenser, a trap mounted within said condenser, a pipe for conducting water into and from said trap, a steam pipe for admitting steam into said trap, a valve for opening and closing said steam pipe, and automatic means for opening said valve to admit steam into said trap to force the water from said trap through said first pipe and for closing said valve after the water has been forced from said trap.

4. A device of the character described, comprising a condenser, a trap mounted within said condenser, a pipe for conducting water into and from said trap, a steam pipe for admitting steam into said trap, a valve for opening and closing said steam pipe, automatic means for opening said valve to admit steam into said trap to force the water from said trap through said first pipe and for closing said valve after the water has been forced from said trap, and means for circulating air through said condenser to condense the steam in said trap and cause said automatic means to close said valve.

5. A device of the character described, comprising a trap for receiving water and steam, a return water pipe for admitting water into and conducting water from said trap, a steam pipe opening into said trap, a valve for opening and closing said steam pipe, a thermostatic device for opening and closing said valve, means for cooling said trap and said thermostatic device and causing said thermostatic device to open said valve and thereby admit steam to said trap to force the water from said trap through said return pipe, and means for preventing effective operation of said cooling means for an interval after said valve has been opened.

6. A device of the character described, comprising a condenser a vacuum trap supported in the condenser, a thermostatic device subjected to the temperature in the condenser and vacuum trap, and means operated by said thermostatic device controlling the alternate admission of water and steam into said trap.

7. A device of the character described, comprising a condenser, a vacuum trap supported in the condenser, a thermostatic device subjected to the temperature in the condenser and vacuum trap, and means operated by said thermostatic device controlling the alternate admission of water and steam into said trap and also controlling the cooling and condensing of the steam in the trap to create a vacuum for the admission of water.

8. A device of the character described, comprising a trap, a pipe for admitting water into the trap, a pipe for admitting steam into the trap, a condenser enclosing the trap and having an air inlet and an air outlet, means for conducting air from the air inlet to the air outlet to cool the trap, a pipe for admitting water into the trap, a steam pipe for admitting steam into the trap, and means controlled by said thermostatic device for opening and closing the steam pipe.

9. A device of the character described, comprising a trap, a pipe for admitting water into the trap, a pipe for admitting steam into the trap, a condenser enclosing the trap and having an air inlet and an air outlet, means for conducting air from the air inlet to the air outlet to cool the trap, a pipe for admitting water into the trap, a steam pipe for admitting steam into the trap, and means controlled by said thermostatic device for opening and closing the steam pipe and said outlet passage.

10. A device of the character described, comprising a trap, a cooling system for said trap, a pipe for admitting water into the trap, a steam pipe for admitting steam into the trap, a device for rendering said cooling system ineffective, a valve for opening and closing said steam pipe and mechanism controlled by variations of temperature in the trap for operating said device to render said cooling system alternately effective and ineffective and to close and to open said valve alternately.

11. A device of the character described, comprising a receptacle, a water pipe for conducting water into and from the receptacle, a steam pipe for admitting steam into the receptacle, a valve for opening and closing said steam pipe, and mechanism controlled by the temperature in said receptacle for opening and closing said valve.

12. A device of the character described, comprising a receptacle, a water pipe for conducting water into and from the receptacle, a steam pipe for admitting steam into the receptacle, a valve for opening and closing said steam pipe, and mechanism controlled by the temperature in said receptacle for closing said valve when said temperature exceeds a predetermined maximum and for opening said valve when the temperature in said receptacle becomes reduced below a predetermined degree.

13. A device of the character described, comprising a receptacle, a water pipe for conducting water into and from the receptacle, a steam pipe for admitting steam into the receptacle, a valve for opening and closing said steam pipe, mechanism controlled by the temperature in said receptacle for closing said valve when said temperature exceeds a predetermined maximum and for opening said valve when the temperature in said receptacle becomes reduced below a predetermined degree, and a cooling system for said receptacle controlled by said mechanism.

14. A device of the character described, comprising a receptacle arranged to receive water and steam alternately, a water pipe for conducting water into and from the receptacle, a steam pipe for conducting steam into the receptacle, a cooling system for said receptacle, and mechanism operated by variations in temperature in the receptacle controlling the admission of steam into said receptacle and controlling the operation of said cooling system.

STANLEY C. KNEFEL.